United States Patent Office 3,356,698
Patented Dec. 5, 1967

3,356,698
PREPARATION OF ω-HYDROXIMINOALKANOIC ACIDS
Pierre Lafont, St. Foy-les-Lyons, and Michel Thiers, Lyon, France, assignors to Rhone-Poulenc S.A., Paris, France, a French body corporate
No Drawing. Filed Oct. 14, 1963, Ser. No. 316,184
Claims priority, application France, Nov. 19, 1962, 915,860
7 Claims. (Cl. 260—404)

This invention relates to the preparation of ω-hydroximinoalkanoic acids, and is a continuation-in-part of our Ser. No. 229,179, filed Oct. 8, 1962, and now abandoned.

The ω-hydroximinoalkanoic acids are of value in the production of the corresponding ω-aminoalkanoic acids, into which they may be converted by catalytic hydrogenation by known methods for compounds of this type, for example by hydrogenation in the presence of Raney metal under atmospheric or higher pressure, optionally in the presence of ammonia. The ω-aminoalkanoic acids are useful starting materials for the preparation of polyamides which may be employed for the preparation of films, fibres and moulded objects. 12-aminododecanoic acid is particularly valuable for this purpose.

The simplest process hitherto known for the preparation of 12-aminododecanoic acid consists in hydrolysing dodecanolactam, which is itself prepared in two stages from cyclododecanone via the oxime of this ketone.

According to one feature of the invention an ω-hydroximinoalkanoic acid of formula $$HON=CH-R-CH_2COOH \qquad I$$

wherein R represents a polymethylene chain of at least 2 carbon atoms which is optionally substituted with one or more lower alkyl groups (i.e., alkyl groups of 1 to 4 carbon atoms), especially methyl, ethyl or propyl, by the nitrosation of a ketone of formula

(wherein R is as defined above) in the presence of concentrated sulphuric acid, followed by hydrolysis of the product. The process is particularly valuable for the preparation of acids of the formula $$HON=CH(CH_2)_nCOOH$$

wherein $n$ is an integer from 3 to 10 inclusive, and especially valuable for the preparation of 12-hydroximinododecanoic acid.

This process of the invention is surprising because it is known that the nitrosation of a ketone gives an α-hydroximinoketone and it is also known that α-hydroximinoketones undergo, when subjected to the action of concentrated sulphuric acid, a Beckmann transformation of the second order to give an acid and an amide, in accordance with the following scheme:

(see A. F. Ferris, J. Org. Chem., 25, 12 (1960).

It is also known that cycloalkanones having from 5 to 7 cyclic carbon atoms are converted into α,α'-di(hydroximino)cycloalkanones when they are nitrosated either by a mixture of nitric oxide and air in the presence of catalytic quantities of hydrochloric acid (U.S. Patent No. 2,844,630), or by an alkylnitrite in concentrated hydrochloric acid medium (U.S. Patent No. 2,999,875). It is known also from the same U.S. specification 2,999,875 that these α,α'-di(hydroximino)ketones may be opened and converted into aliphatic ω-cyano-α-hydroximinocarboxylic acids, which can thereafter be converted by hydrogenation into saturated aliphatic α,ω-diaminocarboxylic acids.

It is also known to prepare aliphatic ω-hydroximinocarboxylic acids from cycloalkanones, the ring of which comprises 5 or 6 carbon atoms, by converting them first into hydroxyhydroperoxides, which are thereafter treated with nitric oxide in aqueous alcoholic solution in the presence of ferrous or cuprous salts, and then to transform these ω-hydroximinocarboxylic acids into ω-aminocarboxylic acids by hydrogenation (U.S. Patent 3,024,276). However, this process has the disadvantage that it necessitates the preparation and handling of hydroperoxides, which are unstable bodies, and the use of at least stoichiometric quantities of metal salts, which must thereafter be separated. In addition, the nitrosation yields are fairly low.

12-hydroximinododecanoic acid, which has a melting point of 112–113° C., is a new compound, as also is 8-hydroximinocaprylic acid, which has a melting point of 111–112° C., and these two new compounds form further features of the present invention.

In accordance with a further feature of this invention ω-aminoalkanoic acids are produced in excellent yield by a process requiring only two stages, the first stage being the production of an ω-hydroximinoalkanoic acid by the process described above, and the second stage being a reduction of the ω-hydroximinoalkanoic acid, thus obtained, for example by the known methods described above.

In a preferred procedure for preparing the ω-hydroximinoalkanoic acid, the process is carried out in the following manner. A solution of cycloaliphatic ketone of Formula II is prepared in an organic solvent which is inert under the reaction conditions, for example an aliphatic or alicyclic hydrocarbon, which may be substituted for example by one or more halogen atoms, such as hexane, heptane, cyclohexane, chloroform or carbon tetrachloride. Concentrated sulphuric acid, preferably of density 1.84 (66° Baumé), is then gradually added in a quantity such that the ratio sulphuric acid:ketone is between 1:1 and 5:1, preferably about 3:1. Instead of acid of density 1.84, 100% acid may be employed, but such acid does not afford any advantage either in the quality or the yield of the product.

To the solution thus obtained substantially 1 mole of nitrosating agent is then added for each mole of ketone. The nitrosating agents which may be employed include more especially nitrosyl sulphuric acid, nitrosyl halides (for example nitrosyl chloride), alkali metal salts of nitrous acid such as sodium nitrite or potassium nitrite, and nitrous vapours obtained, for example, by the action of sulphuric acid on an alkali nitrite or by oxidation of ammonia in air. Nitrosyl sulphuric acid is particularly suitable. It can be introduced in crystalline form or in the form of a solution in sulphuric acid, for example in a proportion by weight of 50:50. The sulphuric acid employed may be in anhydrous form or in the commercial 95–97% concentrated form.

During the addition of the nitrosating agent, the medium in which the reaction takes place is cooled and the temperature of this medium is maintained at a value which is preferably proportional to the size of the ring of the ketone starting material. Thus, for cyclopentanone, cyclohexanone and cyclooctanone, it is advantageous to operate in the neighborhood of, or below 0°, 20° and 30° C., respectively, while for cyclododecanone the temperature is preferably below 70° C. After the addition of the nitrosating agent, the reactants are left in contact for from a few minutes to 2 to 3 hours. For a particular ketone, this period of contact should decrease as the temperature increases. However, the temperature should not be allowed to rise too far in an attempt to accelerate the reaction, and in practice there is no advantage in raising the temperature to more than 20° to 30° C. above the temperatures previously indicated during the mixing of the reactants. When the ketone reactant is cyclododecanone, the temperature should be below 70° C. during the period of contact, at a temperature of 20–25° C., a period of 2–3 hours is satisfactory, while at 40° C. a period not substantially greater than 1 hour should be employed. If the reactants are allowed to remain in contact for too long, there is a tendency for the corresponding amido acid, and in some cases tarry products, to form.

The reaction mass thus obtained is thereafter hydrolysed on ice, optionally after separation of the layer of organic solvent, whereafter the hydroxymino acid formed is isolated by the application of any appropriate method, particular account being taken of the solubility of this amino acid. If hydrolysis gives an insoluble product, as in the case of 12-hydroxyiminododecanoic acid, it is sufficient to separate it by filtration, and to wash and optionally to recrystallise it. In other cases, the hydrolysis may result in an aqueous solution of the hydroxymino acid, which is then isolated by extraction with the aid of an appropriate organic solvent. It is to be noted that these hydroxymino acids are soluble in some ordinary organic solvents, such as acetones and ethanol, but sparingly soluble in methyl acetate and benzene.

As starting material, there may be used, instead of the pure cycloalkanone, a mixture of cycloalkanone and cycloalkanol such as is obtained by oxidation of cycloalkanes by means of oxygen or by means of gaseous mixtures containing oxygen.

When the preferred procedure described above is used to prepare 12-hydroxyiminododecanoic acid a substantially quantitative yield can be obtained. The crude acid is obtained as a precipitate from the hydrolysis, and this precipitate melts at about 105° C. It may be purified by recrystallisation from a 50% aqueous ethanol solution or from benzene, and then melts at 112–113° C.

In the preparation of 12-aminododecanoic acid in accordance with the invention, crude or purified 12-hydroxyiminododecanoic acid is preferably subjected to catalytic hydrogenation. For this purpose, one of the general methods of hydrogenating hydroxymino acids, described in the Houbenweyl Encyclopaedia "Methoden der organischen Chemie," vol. 11/1, pp. 511–512 (1957), may be used. However, it has been found that a particularly pure amino-acid is obtained in excellent yields when 12-hydroxyiminododecanoic acid is hydrogenated in the presence, as catalyst, of a Raney metal, for example nickel or cobalt, or of a noble metal, e.g., an Adams' platinum catalyst, in acetic acid.

The hydrogenation in the presence of Raney nickel or cobalt may take place under atmospheric pressure or under pressures ranging up to 200 kg./cm.$^2$, preferably about 10 kg./cm.$^2$, and at temperatures between 20° and 100° C. It is recommended that the operation be carried out in the presence of a concentrated, e.g., 20–35% aqueous ammonia solution, so as to block the acid function and thus to avoid polycondensation reactions between the $NH_2$ and $COOH$ groupings of the amino-acid formed.

When platinum in acetic acid is employed as catalyst, hydrogenation may be carried out at ambient temperature, that is to say, at 15–25° C., and under normal pressure or under a pressure in the neighbourhood thereof, with a small quantity of platinum, for example about 1% by weight in relation to the hydroxymino-acid employed.

It is possible by the new process to obtain 12-aminododecanoic acid in yields higher than 65% calculated on the cyclododecanone employed as starting material in making the hydroxymino-acid.

The following examples illustrate the invention.

EXAMPLE I (a) *Preparation of 12-hydroxyiminododecanoic acid*

Into a 250 cc. spherical flask were introduced 16.44 g. (0.090 mole) of cyclododecanone and 60 cc. of anhydrous cyclohexane. Into the solution obtained were run drop-by-drop with stirring, 33.1 g. 0.337 mole) of sulphuric acid ($d=1.84$), with cooling so that the temperature of the reaction mixture did not exceed 25° C. The mass was then heated to 40° C. and amintained at this temperature for about 30 minutes. A solution of 12.18 g. (0.96 mole) of nitrosylsulfuric acid in 12.18 g. of 100% sulphuric acid was introduced during about 1 hour. Since the reaction was exothermic, the temperature was maintained at 40° C. throughout the addition. The reaction mass was then heated to keep it at 40° C. for 30 more minutes, whereafter it was cooled and the two layers obtained were separated. The cyclohexane layer gave, after evaporation to dryness, 0.2 g. of a white crystalline residue melting at 54–55° C., and consisting of unreacted cyclododecanone.

The acid layer was poured on to 150 g. of crushed ice. A slightly yellow precipitate was obtained, which was filtered and then washed with 9×100 cc. of water until the filtrate was neutral. The cake, dried in vacuo (50 mm. Hg) at 70° C., gave 19.3 of crystals, M.P. about 105° C. After recrystallisation from 150 cc. of a 50/50 mixture of ethanol and water, 17 g. of white crystals, melting at 112–113° C. and stable at room temperature were finally obtained.

Elementary microanalysis, titration of the carboxylic grouping, the positive reactions for the oxime function, and the infra-red spectrum of the product show that it is 12-hydroxyiminododecanoic acid.

By repeating the above experiment, but varying the quantity of sulphuric acid ($d=1.84$) introduced simultaneously with the ketone, or the reaction temperature, or the period for which the reactants are left after the addition of the nitrosation agent, all the other factors remaining the same as in the previous experiment, the results shown in the following table were obtained. The table also indicates the results of the experiment already described in detail.

TABLE

| $H_2SO_4$ in moles | Temperature, ° C. | Period of contact after the addition of the nitrosation agent | Product obtained |
|---|---|---|---|
| 0.09 | 20 | 2 hours | Mixture of hydroxyimino-acid and amido-acid. |
| 0.09 | 40 | 2 to 4 hours | Amido-acid. |
| 0.09 | 80 | Indefinite | Do. |
| 0.16 | 20 | 2 hours, 30 minutes | Hydroxymino acid. |
| 0.16 | 20 | 6 hours | Mixture of hydroxyimino-acid and amido-acid. |
| 0.16 | 40 | 2 hours, 30 minutes | Amido-acid. |
| 0.337 | 20 | 1 hour | Hydroxymino-acid. |
| 0.337 | 40 | 30 minutes | Do. |
| 0.337 | 40 | 3 hours | Amido-acid. |
| 0.337 | 80 | Indefinite | Do. |

The amido-acid of formula $$NH_2-CO-(CH_2)_{10}-COOH$$

has already been described by Heyes and Robert, who obtained it by a different process, (see J. Chem. Soc. p. 4935 (1952)).

It can be deduced from this table that, in order to obtain 12-hydroxyiminododecanoic acid free, or as free as possible, from amido-acid, it is necessary:

(a) to use a molar excess of sulphuric acid in relation to the proportion of cyclododecanone employed, regardless of the reaction temperature chosen;

(b) to operate below 70° C.; and (c) to shorten the period of contact of the reactants in proportion as the temperature is higher.

By repeating the example, operating under exactly the same conditions and with the same proportions of reactants, except that the nitrosylsulfuric acid is dissolved in 95% sulphuric acid, there are obtained 20.3 g. of the hydroxymino-acid melting at 107–108° C. (yield 98%).

By repeating the process employing, in place of pure cyclododecanone, crude cyclododecanone containing 50% of cyclododecanol, the hydroximino-acid is also obtained in good yields.

(b) *Preparation of 12-aminododecanoic acid*

(1) Into a 250 cc. autoclave provided with a stirrer were introduced 5 g. (0.021 mole) of the 12-hydroximinododecanoic acid, M.P. about 105° C., prepared as described above, 50 cc. of absolute ethanol, 10 cc. of a concentrated aqueous ammonia solution (56.8 g. of $NH_3$ dissolved in 100 cc. of water) and 1 g. of Raney nickel. A pressure of 200 kg. per sq. cm. of hydrogen was set up and the mixture was stirred for 1 hour at a temperature of 27° C. The autoclave was thereafter degassed and the reaction mass filtered. After evaporation in vacuo, the filtrate gave 0.4 g. of unreacted 12-hydroximinododecanoic acid. The filter cake was taken up in 150 cc. of a 50/50 mixture of water and n-propanol at the boiling point. The mixture was hot-filtered, and the filtrate was then concentrated to a volume of 60 cc. There was thus obtained a crystalline mass which gave 2.5 g. of product melting at 179–180° C. and had an amino-acid titre of about 95% (determined by titration of the amine function by perchloric acid). Taking into account the recovered hydroximino-acid, the amino-acid yield is about 65% of 100% pure product.

By repeating the foregoing experiment, but at different temperatures and under different pressure, the following results were obtained.

| Pressure on the manometer in kg./cm.$^2$ | Temperature, ° C. | Amino acid yield, percent |
|---|---|---|
| 200 | 40 | 65 |
| 105 | 75 | 65 |
| 10 | 98 | 77 |
| 0 | 55–60 | 55 |

(2) Into a 1000 cc. autoclave provided with a stirrer were introduced 57.2 g. (0.25 mole) of crude 12-hydroximinododecanoic acid, melting at about 105° C., 450 cc. of absolute ethanol, 140 cc. of an aqueous concentrated ammonia solution (of the strength stated in 1) and then 15 g. of Raney cobalt [prepared in accordance with the method described in J. of App. Chem. 7, p. 130 (1917)]. A pressure of 100 kg. of hydrogen is set up and the mixture is stirred for 7 hours at a temperature of 80° C. The autoclave is thereafter degassed and the reaction mixture is worked up as described under 1 above. There are thus obtained 43 g. of 12-aminododecanoic acid, M.P. 183° C., having a 100% titre (yield 80%).

By proceeding with the same quantities of reactants and following the same procedure as above, except that a hydrogen pressure of 15 kg. is maintained and stirring is effected for 3 hours at a temperature of 100° C., there are recovered at the end of the operation 36.6 g. of 12-aminododecanoic acid, having a titre of 100%.

(3) Into a 1-litre conical flask provided with a stirrer were introduced 0.1 g. of Adams' platinum and 50 cc. of glacial acetic acid. The mixture was saturated with hydrogen, and 10.1 g. of pure 12-hydroximinododecanoic acid, M.P. 112–113° C., in the form of a solution in 250 cc. of glacial acetic acid, were then added. Hydrogen was passed through the mixture at ambient temperature (about 20° C.) and under an absolute pressure of 760 mm. Hg. The rate of flow of the hydrogen was about 0.7 litre per hour for 5 hours.

The contents of the flask was then filtered, the acetic acid was driven off by concentration of the filtrate in vacuo, the residue was taken up in 150 cc. of water and again filtered, and the precipitate obtained was dried. There were thus obtained 6 g. of 12-aminododecanoic acid, M.P. 179–181° C.

EXAMPLE II

Into a 100 cc. three-necked spherical flask provided with a dropping funnel and a stirring system are introduced 8.4 g. of cyclopentanone (0.1 mole) and 40 cc. of hexane. Into the solution obtained are run drop-by-drop in 10 minutes 18.4 cc. of sulphuric acid at 66° Baumé (0.33 mole), the temperature being maintained between −1° and −5° C., whereafter there are very slowly added (running-in period about 20 mintues) 24.6 g. of a 50% solution of nitrosylsulphuric acid in sulphuric acid at 66° Baumé (0.09 mole of pure nitrosyl acid sulphate), the temperature being maintained in the neighbourhood of 0° C. in the course of this addition. The temperature is thereafter allowed to rise to about 20° C. and the reaction mass maintained at this temperature for 2 hours 10 minutes. The reaction mass is thereafter hydrolysed on 120 g. of crushed ice, the acid layer is separated from the hexane layer by decantation, this acid layer is washed with 2×50 cc. of ether and is neutralised to pH 3–4 by the addition of 100 cc. of sodium hydroxide at 36° Baumé, whereafter the product is extracted with 6×100 cc. of a mixture of methyl acetate and ether (50:50). There is thus obtained a crude solid product which, on recrystallisation from methyl acetate, gives 7.25 g. of a crystalline product melting at 110–111° C., which is ω-hydroximinovaleric acid, of which the constitution is confirmed by gravimetric analysis and infra-red spectrography. Yield: 51% of the theoretical yield.

This product, on hydrogenation at 60° C. under 100 atmospheres on Raney nickel in the presence of an excess of aqueous ammoniacal solution, is converted into 5-amino-valeric acid, M.P. 151° C.

EXAMPLE III

The procedure of Example II is followed, starting with 9.8 g. of cyclohexanone, (0.1 mole) in solution in 40 cc. of hexane. During the running-in first of the sulphuric acid (10 minutes) and then of the nitrosylsulphuric acid (20 minutes), the temperature is maintained between 16° and 20° C. The mixture is thereafter maintained at 20° C. for about 1 hour, hydrolysed and treated as before. There are thus obtained 8.5 g. of crude product which, on recrystallisation from a mixture of methyl acetate and ether (50: 50), gives 5.53 g. of ω-hydroximinocaproic acid, M.P. 114–116° C. (Yield 38.1%). On hydrogenation by the usual methods on Raney nickel (60° C., 100 atmospheres, excess of ammonia), 6-aminocaproic acid. M.P. 200° C., is obtained.

EXAMPLE IV

Into a 250 cc. three-necked spherical flask are introduced 36 g. of cyclooctane (0.286 mole) and 150 cc. of cyclohexane, and there are slowly added over a period of 10 minutes, with the aid of a dropping funnel, 46 cc. of sulphuric acid at 66° Baumé, the temperature being maintained in the neighbourhood of 30° C. The mixture is maintained at this temperature with stirring for about 30 more minutes, whereafter there are very slowly added (about 20 minutes) 34.25 g. of nitrosylsulfuric acid as a 50% solution in sulphuric acid at 66° Baumé, the temperature still being maintained at 30° C., and the stirring is continued for one hour. From the cyclohexane layer separated by decantation is obtained by evaporation 1.5 g. of unconverted clyclooctanone. The acid layer is hydrolysed on 600 g. of crushed ice. There are then added 325 cc. of a 10 N aqueous solution of sodium hydroxide until the pH is 8–9; the sodium sulphate formed is filtered off and the filtrate is heated at 40° C. for 20 minutes in the presence of 5 g. of decolorising charcoal. The product is filtered and the filtrate is cooled to 0° C. and acidified by the addition of 50 cc. of 25% aqueous hydrochloric acid solution, the temperature being maintained below 12° C. The liberated hydroximino acid precipitates. It is filtered off and washed with cold water. There are thus obtained 39.4 g. of crude product which, on recrystallisation from water, gives 34.4 g. of product melting at 111–111.5° C., which is ω-hydroximinocaprylic acid, of which the constitution is determined by gravimetric analysis and infra-red spectrography. Yield 69.5%. Hydrogenation of this product at 70° C. under 100 atmospheres on Raney nickel and in the presence of ammonia gives 8-aminocaprylic acid, M.P. 192° C., which is currently employed as an intermediate product in the synthesis of polyamides.

EXAMPLE V

Into a 100 cc. spherical flask are introduced 7.7 g. (0.05 mole) of cyclodecanone in solution in 20 cc. of cyclohexane. There are run-in drop-by-drop with stirring 9.2 cc. (0.16 mole) of sulphuric acid (66° Bé.). At the end of 15 minutes, a solution of 6.1 g. (0.048 mole) of nitrosylsulfuric acid in 6.1 g. of sulphuric acid (66° Bé.) is slowly added, whereafter the reaction is allowed to continue for one hour, the temperature being maintained between 16° and 20° C. throughout the operation.

Thereafter, by proceeding in accordance with the foregoing examples, the reaction mass is subjected to hydrolysis treatment on crushed ice, neutralisation with sodium hydroxide, filtration and acidification of the filtrate. There is thus obtained a precipitate which, when washed with water to neutrality and dried in vacuo, gives 8.57 g. of crystalline product, M.P. 108.5–109.5° C. On recrystallisation from 50% ethyl alcohol, there are obtained 6.76 g. of 10-hydroximinodecanoic acid, M.P. 110.5–111° C., analysing 99.5% of acid. Yield 67.3%.

We claim:
1. Process for the preparation of an ω-hydroximinoalkanoic acid of formula

$$HON=CH(CH_2)_nCOOH$$

wherein R represents a divalent radical selected from the group consisting of polymethylene radicals containing 2 to 9 carbon atoms and polymethylene radicals containing 2 to 9 carbon atoms and having one lower alkyl substituent which comprises the steps of (1) contacting a ketone of formula

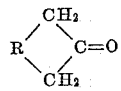

with nitrosylsulphuric acid, a nitrosyl halide, an alkali metal salt of nitrous acid or nitrous vapours for less than 3 hours at up to 70° C. in the presence of concentrated sulphuric acid, (2) hydrolysing the product, and (3) separating the ω-hydroximinoalkanoic acid produced.

2. Process for the preparation of an ω-hydroximinoalkanoic acid of formula $$HON\dot{=}CH(CH_2)_nCOOH$$

wherein n represents an integer from 3 to 10 inclusive, which comprises the steps of (1) contacting a solution in an organic solvent of a cyclic ketone of formula

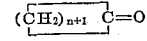

with a substantially equimolar proportion of nitrosyl sulphuric acid, nitrosyl halide, an alkali metal salt of nitrous acid, or nitrous vapours, said contacting being carried out for less than 3 hours at up to 70° C. and in the presence of 1 to 5 moles of sulphuric acid per mole of said cyclic ketone, (2) hydrolysing the reaction mass resulting from step (1) and (3) separating the ω-hydroximinoalkanoic acid thus produced.

3. Process for the preparation of 12-hydroximinododecanoic acid which comprises contacting cyclododecanone in an inert solvent and in the presence of concentrated sulphuric acid with a substantially equimolecular amount of nitrosyl sulphuric acid, a nitrosyl halide, an alkali metal salt of nitrous acid, or nitrous vapours, using more than one mole of sulphuric acid per mole of cyclododecanone, for less than three hours at up to 70° C., hydrolysing the product with water, and separating the 12-hydroximinododecanoic acid produced.

4. Process according to claim 3 in which the nitrosating agent is nitrosyl sulphuric acid.

5. Process for the preparation of 12-hydroximinododecanoic acid which comprises contacting cyclododecanone in an inert solvent and in the presence of concentrated sulphuric acid with nitrosyl sulphuric acid, using one mole of the nitrosyl sulphuric acid per mole of cyclododecanone and one to five moles of sulphuric acid per mole of cyclododecanone, for from a few minutes to three hours at 0° to 70° C., hydrolysing the product with water and separating the 12-hydroximinododecanoic acid produced.

6. 12-hydroximinododecanoic acid.
7. 8-hydroximinocaprylic acid.

References Cited

UNITED STATES PATENTS 3,024,276    3/1962    Chiusoli et al. _____ 260—534

NICHOLAS S. RIZZO, *Primary Examiner.*

A. H. SUTTO, *Assistant Examiner.*